United States Patent Office 3,845,010
Patented Oct. 29, 1974

3,845,010
THERMOSET MOLDING POWDERS EMPLOYING GLYCIDYL METHACRYLATE FUNCTIONAL POLYMER AND DIBASIC ACID CROSSLINKING AGENT AND MOLDINGS THEREOF
Santokh S. Labana, Dearborn Heights, and Ares N. Theodore, Farmington, Mich., assignors to Ford Motor Company, Dearborn, Mich.
No Drawing. Continuation of abandoned application Ser. No. 209,341, Dec. 17, 1971. This application Feb. 15, 1974, Ser. No. 443,182
Int. Cl. C08f 45/10
U.S. Cl. 260—42.18          20 Claims

ABSTRACT OF THE DISCLOSURE

Novel thermosetting resin powders which can be molded to form products characterized, in flexural measurement, by relatively high elongation-to-break, strength and modulus and by high glass transition temperature are prepared from a mixture of a prepolymer consisting essentially of glycidyl methacrylate, methyl methacrylate and methacrylonitrile or acrylonitrile and a dibasic crosslinking agent.

---

This is a continuation of application Ser. No. 209,341, filed Dec. 17, 1971, and now abandoned.

This invention relates to self-crosslinking, dry thermosettable molding powders suitable for rapid curing during processing as by compression and injection molding and applicable to the production of rigid, tough, structural materials as, for instance, automobile body panels, electrical appliance housings, boat construction, storage tanks, conduits, particularly those for the transmission of heated fluids, etc., and to molded articles produced therefrom.

The thermosets of this invention, after molding, have a glass transition above 90° C., preferably above 120° C. A room temperature (20°–25° C.) these moldings exhibit, in flexural measurement, a strength in the range of about 16,000 to about 30,000 p.s.i. or higher, a modulus in the range of about 1.2–2.25×10$^6$ p.s.i. or higher and elongation-to-break in the range of about 1 to about 3% or higher.

Glass transition temperature is that temperature at which a glass-like material loses its rigidity and hardness and approaches the behavior of an elastomer. More specifically, glass transition temperature is defined as the temperature at which such material shows a maximum in its mechanical damping at low frequencies, e.g., about 1 cycle per second.

I. Composition of the Prepolymer

The prepolymer preferably has at least three constituent monomers and, except for limited substitution as hereinafter noted, has the following basic composition:

glycidyl methacrylate 15–40, preferably 20–35 wt. percent
methacrylonitrile 0–30, preferably 10–25 wt. percent
methyl methacrylate balance Acrylonitrile may be substituted in whole or in part for the methacrylonitrile but the latter is the preferred reactant in that products produced from prepolymers containing this constituent and the crosslinking agents used herein have a higher heat distortion (glass transition) temperature than do the corresponding products using acrylonitrile, all other factors being equal.

A minor portion of the methyl methacrylate, preferably not more than ⅓ thereof, may be replaced with styrene, alpha methyl styrene, vinyl acetate or a different ester of acrylic or methacrylic acid and a monohydric alcohol, preferably a $C_2$–$C_4$ alcohol, e.g., ethyl acrylate, butyl acrylate, butyl methacrylate, etc. This substitute should not exceed about 15 percent of the total monomers used to form the prepolymer and preferably does not exceed 10% of the same. In the case of the $C_4$ substitutes, this component preferably does not exceed ⅕ of the methyl methacrylate. The substitutes mentioned in this paragraph, with the exception of styrene, increase the flexibility of the polymer, i.e., the elongation-to-break factor, and decrease the softening point (glass transition temperature).

II. Properties of the Prepolymer

The prepolymer has an average molecular weight in the range of about 1,500 to about 16,000, preferably about 2,000 to about 10,000, and more preferably about 3,500 to about 8,000, as determined by vapor phase osmometry using methyl ethyl ketone as solvent. Less than about 5% of the molecules thereof should have a molecular weight below about 1,000.

The prepolymer has a softening point above 25° C., preferably in the range of about 50° to about 110° C.,

III. Preparation of the Prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 wt. percent of the combined monomer weight. Conventional free radical initiators are suitable for this purpose, e.g., acylperoxides, peresters, and azo compounds. Specific materials which have been used successfully include 2,2'-azobis (2-methyl propionitrile) hereinafter termed AIBN, benzoyl peroxide, 5-butyl perbenzoate, and t-butyl peroxypivalate.

As aforementioned, the reaction is carried out in an inert solvent, e.g., toluene or a mixture of toluene and dioxane, etc. Advantageously, the weight of the solvent is equal to or in excess of the combined weight of the reactant and the initiator.

In a preferred method of preparation, the monomeric reactants and the free radical initiator are added in small increments, e.g., dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner. The reaction solution is further diluted with additional solvent until the prepolymer comprises about 20 to about 30 weight percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation, the prepolymer can be formed by the well-known techniques of emulsion polymerization, bulk polymerization and suspension polymerization. Suspension polymerization is preferably carried out using water as the suspending medium. Since ionic stabilizers react with glycidyl methacrylate, only nonionic materials may be used for stabilizing the suspension. Polyvinyl alcohol and an alkyl aryl polyether alcohol (Triton X 100—Rohn & Haas Co.) have been found quite satisfactory. To carry out suspension polymerization, the monomer mixture is added to cooled (about 0° C.) 0.16% solution of polyvinyl alcohol is water. The mixture is stirred rapidly and the initiator added over a period of about 30 minutes. The temperature of the reaction mixture is then controlled to remain between 55° and 60° C. for six to eight hours. After cooling to room temperature, the polymer is collected by filtration. Because the polymerization must be carried out below 65° C., only the initiators which are an efficient source of free radicals below this temperature may be used. Suitable initiators for suspension polymerization include t-butyl peroxypivalate and diisopropyl peroxycarbonate. The molecular weight of the prepolymer can be controlled, among other ways, by using 0.1 to about 5 weight percent (based on monomer weight) of a chain transfer agent such as lauryl mercaptan.

IV. Crosslinking Agent

The dibasic acids which are used as crosslinking agents in this invention are $C_4$–$C_{20}$, dibasic acids which have melting points in the range of 30° to 160° C., preferably 30° to 130° C. Among these, those dibasic acids having an odd number of carbon atoms are preferred. Typical dibasic acids which are suitable for this use includes adipic acid, azelaic acid, 2,4'-benzophenone-dicarboxylic acid, brassylic acid, 1,4-cyclohexane dicarboxylic acid, fumaric acid, glutaric acid, alpha ketoglutaric acid, itaconic acid, maleic acid, malonic acid, octadecyl malonic acid, pimelic acid, phthalic acid, isophthalic acid, terephthalic acid, sebacic acid, suberic acid, succinic acid, tetradecanedioic acid, and undecanedioic acid. The dibasic acid is employed in an amount which provides about 0.8 to about 1.2 carboxyl groups per each epoxy group in the molding powder. These acids consist essentially of carbon, hydrogen and oxygen, i.e., they either consist exclusively of these elements or, if substituted, are substituted with atoms or functional groups which do not interfere with the crosslinking reaction, e.g., sulfonyl groups, nitro groups, alkylthio groups and halogens.

V. Partial Replacement For Prepolymer With Epoxy Compound

A minor portion, i.e., about 2 to about 20 percent, of the epoxy groups provided by the prepolymer may be replaced by substituting for that amount of the prepolymer an epoxy compound having at least two epoxy groups, preferably a diepoxide.

These diepoxides should be liquid at 140° C. or below and have molecular weight in the range of about 300 to about 4,000 and viscosity at 140° C. of less than 50 poises.

The diepoxide may be an aromatic, an acylic aliphatic or a cycloaliphatic diepoxide. Such diepoxides should consist essentially of carbon, hydrogen and oxygen but may have substituents which do not interfere with the crosslinking reactions, e.g., sulfonyl groups, nitro groups, alkylthio groups and halogens.

These diepoxides are well known in the art and many are commercially available. Typical examples include diglycidyl esters of polybasic or dibasic acids as disclosed in United States Pat. No. 2,866,767; diglycidyl ethers of dihydric phenols as disclosed in United States Pat. Nos. 2,467,171; 2,506,486; 2,640,037; and 2,841,595; diglycidyl ethers of diols as disclosed in United States Pat. Nos. 2,538,072 and 2,581,464 and diepoxides obtained by peracid epoxidation of dienes. A collection of suitable diepoxides are illustrated in U.S. Patent Application Serial No. 43,895, filed June 5, 1970 and these disclosures are incorporated herein by reference. Although the diepoxides are to be preferred for the present invention, low viscosity polyepoxides may also be advantageously used.

VI. Catalysts

A catalyst is employed in the molding powder mix to facilitate the crosslinking reaction. Quaternary ammonium salts exhibit a high degree of specificity for the epoxy-anhydride reaction. These include tetrabutyl ammonium iodide, chloride, bromide, tetraethyl ammonium iodide, chloride and bromide, tetramethyl ammonium bromide, chloride and iodide, benzyl trimethyl ammonium iodide, chloride and bromide, benzyl dimethyl phenyl ammonium chloride, bromide and iodide, stearyl dimethyl benzyl ammonium iodide, bromide and chloride, etc. Catalyst of this type are useful at levels of about 0.05 to about 1.0 wt. percent of the combined reactants.

Other catalysts which may be used include solid tertiary amines such as triethylene diamine, amine salts such as trimethylamine-p-toluene sulfonate or imidazoles such as 2-ethyl-4-methyl imidazole or metal carboxylates such as lithium benzoate. Catalysts of these types are useful at the same concentration levels above set forth.

These catalysts are found to be latent catalysts for carboxyl-epoxy reactions. That is to say that the catalysts do not significantly enhance the rate of reaction at room temperature but are effective only above certain temperatures. The catalysts that are latent up to at least 50° C. are preferred.

VII. Preparation Of The Molding Powder Mix

The powdered prepolymer, the crosslinking agent and the catalyst are dissolved in a suitable solvent, e.g., acetone, methylene chloride, benzene, etc., and the solution is thoroughly stirred. The solvent is evaporated under vacuum leaving a solid cake which is crushed to a fine powder. The powder is further dried under vacuum so that it contains less than one percent of the solvent.

Alternatively, to the prepolymer solution as obtained by polymerization are added crosslinking agent and the catalyst. The solution is stirred until homogeneous and then added slowly to a vigorously stirred precipitating solvent such as hexane. The precipitated powder is dried under vacuum. To ensure its homogeneity, the molding powder is passed through a roll mill at 50° to 100° C. In lieu of employing the precipitation solvent and roll mill, one may merely evaporate the solvent of the prepolymer solution.

Another method of preparing the molding powder consists of mixing together the powdered prepolymer, crosslinking agent, and catalyst and homogenizing by passing through an extrusion mixer or a roll mill.

If desired, reinforcing fillers such as asbestos, glass fibers, clay, calcium carbonate, calcium silicate, etc., may also be incorporated in the molding powders. A particularly effective filler is calcium metasilicate ($CaSiO_3$).

The powders thus prepared are suitable for use in injection molding, compression molding and transfer molding.

This invention will be more fully understood from the following illustrative examples wherein flexural properties of the molded specimens are determined by Flexural Test, American Society of Testing & Materials, D 790–1966. In this test, rectangular bars having thickness ⅛ inch, width 0.500 inch–0.600 inch and length 4 inches are used for determining the flexural properties. A table model Instron Mechanical Testing Machine is used herein for testing. It is set up at a crosshead speed of 0.04 in./min. and a recorder chart speed of 2 inches/min. The formulas in procedure B (ASTM-D 790-66) are used for the calculation of Flexural Modulus, Elongation-To-Break and Strength.

The prepolymers in the following illustrative examples have softening points between 50° and 110° C. with less than 5% of the molecules thereof having molecular weight below 1,000. The reinforced molded articles of all such examples have glass transition temperatures above 90° C., flexural strength above about 16,000 p.s.i., flexural modulus above about $1.2 \times 10^6$ p.s.i. and elongation-to-break above 1%.

Example 1

A prepolymer is prepared from the following components in the manner hereinafter set forth:

| Reactants | Amount (gms.) |
| --- | --- |
| glycidyl methacrylate | 133 |
| methacrylonitrile | 79.5 |
| methyl methacrylate | 217.5 |

AIBN, i.e., 2,2'-azobis-(2-methylpropionitrile) in the amount of 13.5 grams (3% based on combined weight of reactants) are added to the monomer mixture. The solution is added dropwise over a 4 hour period into 488 ml. toluene at 108°–111° C. under nitrogen atmosphere. Then 2.0 grams of AIBN dissolved in 20.0 ml. acetone are added over a ½ hour period and refluxing is continued for 3 additional hours.

The polymer solution is diluted with 800 ml. acetone and coagulated in 5 volumes hexane. The white powder is dried in vacuum oven at 70° C. for 35 hours. The copolymer is found to have molecular weight of $M_w/M_n = 6231/3466$ and WPE of 496.

This dry copolymer is used in preparation of molding powder. In this process, 30.0 grams of prepolymer are dry blended with 5.7 grams of azelaic acid and 0.0544 grams of tetrabutyl ammonium iodide. After ball-milling the ingredients for 15 hours, 28.0 grams of the molding powder are combined with 32.0 grams of calcium metasilicate ($CaSiO_3$) and ball-milled for 2 hours. The powder mix is combined with 20.0 grams of chopped glass fibers (¼ inch average length—all chopped glass fibers used in succeeding examples are of this length). After combining the molding powder with the chopped glass fibers, the mixture is tumbled for 5 minutes. It is then passed through a tower equipped with screen in order to achieve good distribution of fibers.

The final powder mix including molding powder, particulate $CaSiO_3$ and chopped glass fibers is preformed in a 4.7 x 5.2 x ⅛ inch mold—all sheets molded in succeeding examples are of these dimensions. Then the preform is molded at 380° F. for 30 minutes under a pressure of 1500 p.s.i. The room temperature flexural properties of the molded sheet are as follows:

| | |
| --- | --- |
| Flexural Strength, p.s.i. | 26,300 |
| Elongation-To-Break, percent | 2.0 |
| Flexural Modulus, p.s.i. | $1.8 \times 10^6$ |

This molding powder is found to be still processable after standing for 2 months at room temperature.

Example 2

The prepolymer of Example 1 in the amount of 30 grams is mixed with 3.2 grams malonic acid and 0.034 grams triethylene diamine. After ball-milling for 15–20 hours, the molding powder in the amount of 28.0 grams are combined with 32.0 grams of particulate filler, i.e., $CaSiO_3$, and ball-milled for 2 hours. The powder mix is combined with 20 grams of chopped glass fibers and the mixture is tumbled to distribute the glass fibers. A preform is made for molding.

A sheet of this material is molded under identical molding conditions as those employed in Example 1.

Example 3

The prepolymer of Example 1 in the amount of 30.0 grams is mixed with 4.4 grams adipic acid and 0.035 grams tetrabutyl ammonium iodide. After dry blending the ingredients by ball-milling for 15 hours, 28.0 grams of molding powder are mixed with 32.0 grams of $CaSiO_3$ and ball-milled for 2 hours. The powder mix is combined with 20 grams of chopped glass fibers and their mixture is tumbled to distribute the glass fibers. A preform is made for molding.

A sheet of this is molded under identical molding conditions as those employed in Example 1.

Example 4

The prepolymer of Example 1 in the amount of 30.0 grams is mixed with 4.85 grams of pimelic acid (pentanedicarboxylic acid) and 0.035 grams of tetrabutyl ammonium iodide. After ball-milling the ingredients for 15 hours, a molding powder is obtained. This molding powder in the amount of 28.0 grams is mixed with 32.0 grams of $CaSiO_3$ and ball-milled for 2 hours. The powder mix is then combined with 20 grams of chopped glass fibers and the mixture is tumbled to distribute the glass fibers. A preform is made for molding.

A sheet of this material is molded under the identical molding conditions used in Example 1.

Example 5

The procedure of Example 4 is repeated except for the differences that 5.3 grams of suberic acid (1,6-hexanedicarboxylic acid) and 0.035 grams tetrabutyl ammonium bromide are substituted for the pimelic acid and the tetrabutyl ammonium iodide.

Example 6

The procedure of Example 4 is repeated except for the differences that 6.1 grams of sebacic acid (1,8-octanedicarboxylic acid) and 0.036 grams tetrabutyl ammonium chloride are substituted for the pimelic acid and tetrabutyl ammonium iodide.

Example 7

The procedure of Example 6 is repeated except for the difference that 6.534 grams of undecanedioic acid is substituted for the sebacic acid.

Example 8

The procedure of Example 4 is repeated except for the differences that 4.4 grams alpha ketoglutaric acid and 0.035 grams tetraethyl ammonium bromide are substituted for the pimelic acid and the tetrabutyl ammonium iodide.

Example 9

The procedure of Example 4 is repeated except for the differences that 10.8 grams of octadecyl malonic acid and 0.041 grams of tetramethyl ammonium iodide are substituted for the pimelic acid and the tetrabutyl ammonium iodide.

Example 10

The procedure of Example 4 is repeated except for the differences that 7.4 grams of brassylic acid (hendecanedicarboxylic acid) and 0.038 grams tetramethyl ammonium bromide are substituted for the pimelic acid and the tetrabutyl ammonium iodide.

Example 11

The preceding examples are repeated with the difference that 0.8 equivalents of the dicarboxylic acid cross-linking agent are employed per equivalent of epoxy used in the molding powder mixture.

Example 12

The preceding examples are repeated with the differences that 1.2 equivalents of dicarboxylic acid cross-linking agent are employed per equivalent of epoxy used in the molding powder.

Example 13

The preceding examples are repeated with the difference that the prepolymer has average molecular weight ($M_n$) of about 1500. The prepolymer (acrylic copolymer) is made using the procedure of Example 1 except that 6 weight percent AIBN is used instead of 3 weight percent.

Example 14

The preceding examples are repeated with the difference that the prepolymer has average molecular weight ($M_n$) of about 5,000. The prepolymer is prepared using the procedure of Example 1 except that 2% of AIBN are used instead of 3 weight percent.

Example 15

The preceding examples are repeated with the difference that the prepolymer has average molecular weight ($M_n$) of about 8,000. The prepolymer is prepared using the procedure of Example 1 except that 1 weight percent AIBN is used instead of 3 weight percent.

Example 16

The preceding examples are repeated with the difference that the monomers used to prepare the epoxy-functional prepolymer are employed in the following relative amounts:

|  | Wt. percent |
|---|---|
| Glycidyl methacrylate | 15 |
| Methacrylonitrile | 18 |
| Methyl methacrylate | 67 |

Example 17

Examples 1–15 are repeated with the difference that the monomers used to prepare the epoxy-functional prepolymer are employed in the following relative amounts:

|  | Wt. percent |
|---|---|
| Glycidyl methacrylate | 20 |
| Methacrylonitrile | 18 |
| Methyl methacrylate | 62 |

Example 18

Examples 1–15 are repeated with the difference that the monomers used to prepare the epoxy-functional prepolymer are employed in the following relative amounts:

|  | Wt. percent |
|---|---|
| Glycidyl methacrylate | 25 |
| Methacrylonitrile | 18 |
| Methyl methacrylate | 57 |

Example 19

Examples 1–15 are repeated with the difference that the monomers used to prepare the epoxy-functional prepolymer are employed in the following relative amounts:

|  | Wt. percent |
|---|---|
| Glycidyl methacrylate | 40 |
| Methacrylonitrile | 18 |
| Methyl methacrylate | 42 |

Example 20

Examples 1–15 are repeated with the difference that the monomers used to prepare the epoxy-functional prepolymer are employed in the following relative amounts:

|  | Wt. percent |
|---|---|
| Glycidyl methacrylate | 30 |
| Methacrylonitrile | 0 |
| Methyl methacrylate | 70 |

Example 21

Examples 1–15 are repeated with the difference that the monomers used to prepare the epoxy-functional prepolymer are employed in the following relative amounts:

|  | Wt. percent |
|---|---|
| Glycidyl methacrylate | 30 |
| Methacrylonitrile | 10 |
| Methyl methacrylate | 60 |

Example 22

Examples 1–15 are repeated with the difference that the monomers used to prepare the epoxy-functional prepolymer are employed in the following relative amounts:

|  | Wt. percent |
|---|---|
| Glycidyl methacrylate | 30 |
| Methacrylonitrile | 25 |
| Methyl methacrylate | 45 |

Example 23

Examples 1–15 are repeated with the difference that the monomers used to prepare the epoxy-functional prepolymer are employed in the following relative amounts:

|  | Wt. percent |
|---|---|
| Glycidyl methacrylate | 25 |
| Methacrylonitrile | 30 |
| Methyl methacrylate | 45 |

Example 24

Examples 1–19 and 21–23 are repeated with the difference that 25 mole percent of the methacrylonitrile is replaced with an equivalent amount of acrylonitrile.

Example 25

Examples 1–19 and 21–23 are repeated with the difference that 50 mole percent of the methacrylonitrile is replaced with an equimolar amount of acrylonitrile.

Example 26

Examples 1–19 and 21–23 are repeated with the difference that 75 mole percent of the methacrylonitrile is replaced with an equimolar amount of acrylonitrile.

Example 27

Examples 1–19 and 21–23 are repeated with the difference that all of the methacrylonitrile is replaced with acrylonitrile.

Example 28

Examples 1–27 are repeated with the difference that 25 mole percent of the methyl methacrylate is replaced with an equimolar amount of styrene.

Example 29

Examples 1–27 are repeated with the difference that 25 mole percent of the methyl methacrylate is replaced with an equimolar amount of alpha-methyl styrene.

Example 30

Examples 1–27 are repeated with the difference that 25 mole percent of the methyl methacrylate is replaced with an equimolar amount of vinyl acetate.

Example 31

The procedure of Example 1 is repeated with the difference that 20 mole percent of the methyl methacrylate is replaced with 5 mole percent ethyl acrylate, 5 mole percent butyl acrylate, 5 mole percent butyl methacrylate and 5 mole percent 2-etheyl hexyl acrylate.

Example 32

The procedure of Example 1 is repeated except for the difference that an equivalent amount of dodecanedioic acid is substituted for the azelaic acid and an equivalent amount of benzyl dimethyl phenyl ammonium chloride is substituted for the tetrabutyl ammonium iodide.

Example 33

The procedure of Example 1 is repeated except for the differences that an equivelant amount of tetradecanedioic acid is substituted for the azelaic acid and an equivalent amount of benzyl triethyl ammonium chloride is substituted for the tetrabutyl ammonium iodide.

Example 34

The procedure of Example 1 is repeated with the difference that an equivalent amount of 1,4-cyclohexane dicarboxylic acid is substituted for the azelais acid.

Example 35

The procedure of Example 1 is repeated with the difference that an equivalent amount of itaconic acid is substituted for the azelaic acid.

Example 36

The procedure of Example 1 is repeated with the difference that an equivalent amount of maleic acid is substituted for the azelaic acid.

Example 37

The procedure of Example 1 is repeated with the difference that an equivalent amount of fumaric acid is substituted for the azelaic acid.

Example 38

The procedure of Example 1 is repeated with the difference that an equivalent amount of phthalic acid is substituted for the azelaic acid.

Example 39

The procedure of Example 1 is repeated with the difference that an equivalent amount of isophathalic acid is substituted for the azelaic acid.

Example 40

The procedure of Example 1 is repeated with the difference that an equivalent amount of terephthalic acid is substituted for the azelaic acid.

Example 41

The procedure of Example 1 is repeated with the difference that an equivalent amount of 2,4'-benzophenonedicarboxylic acid is substituted for the azelaic acid.

Example 42

A prepolymer is prepared using the procedure of Example 1 from monomers employed in the following relative amounts:

|  | Wt. percent |
|---|---|
| Glycidyl methacrylate | 20 |
| Methyl methacrylate | 55 |
| Ethyl acrylate | 25 |

With this mix is used 1 weight percent AIBN (basis combined weights of reactants). This copolymer is found to have a Tg (glass transition temperature) of about 50° C. and an average molecular weight of about 8,500. This copolymer in the amount of 30.0 grams are combined with 2.5 grams succinic acid and 0.033 grams benzyl dimethyl phenyl ammonium chloride. This mix is ball-milled for 15 hours. The resultant molding powder is processed using the procedure of Example 1 and molded using the molding conditions of Example 1.

Example 43

A prepolymer is prepared using the procedure of Example 1 from monomers employed in the following relative amounts:

|  | Wt. percent |
|---|---|
| Glycidyl methacrylate | 15 |
| Methyl methacrylate | 57 |
| Isobornyl methacrylate | 28 |

With this mix is used 1 weight percent AIBN (basis combined weights of reactants). This copolymer is found to have a Tg of about 110° C. and a molecular weight of about 8,500.

This copolymer in the amount of 30 grams is combined with 2.1 grams glutaric acid and 0.320 grams tetrapropyl amonium iodide. After ball-milling for 15 hours, the resultant molding powder is processed using the procedure of Example 1 and molded using the molding conditions of Example 1.

Example 44

The prepolymer of Example 1 in the amount of 28.0 grams is mixed with 11.5 grams of an adipic acid-diepoxide adduct-blend and 0.040 grams of tetrabutyl ammonium iodide.

The adduct-blend is prepared from 44.0 grams adipic acid and 70 grams of a commercially available diepoxide. This diepoxide has the following properties: melting range 64–76° C., epoxide equivalent about 450–525, and average molecular weight of about 900. This diepoxide is represented by the following structural formula wherein n average about 2.

The diepoxide is melted and the adipic acid added thereto with stirring. The mixture is kept at a temperature of 140°–150° C. for 2–3 minutes.

The prepolymer, adduct-blend and catalyst are ball-milled for 15 hours. The resultant molding powder mix are then processed using the procedure of Example 1 and molded using hte molding conditions of Example 1.

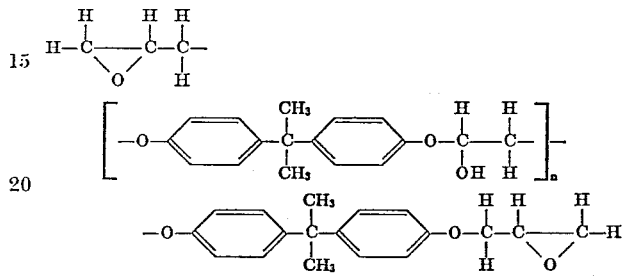

Example 45

The procedure of Example 44 is repeated with the difference that the adipic acid is replaced with an equivalent amount of phthalic acid.

Example 46

The procedure of Example 44 is repeated with the difference that the adipic acid is replaced with an equivalent amount of tetradecanedioic acid.

Example 47

The procedure of Example 44 is repeated with the difference that the adipic acid is replaced with an equivalent amount of suberic acid.

Example 48

The procedure of Example 44 is repeated with the difference that the adipic acid is replaced with an equivalent amount of azelaic acid.

Example 49

The procedure of Example 44 is repeated with the difference that equimolar amounts of an aliphatic diepoxide are substituted for the aromatic diepoxide. This aliphatic diepoxide is synthesized in the following manner: to a 2,000 ml., 3-neck flask equipped with stirrer, dropping funnel, thermometer and nitrogen inlet, is added 1 mole of 2,3-butanediol (91.12 gms.) and 4 moles of epichlorohydrin (370 gms.). The temperature at 110° C. while 2 moles sodium hydroxide (80.0 gms.) is added dropwise as a 30% aqueous solution. The rate of addition is regulated so that the reaction mixture remains neutral. After about 3 hours, the organic layer is separated, dried, distilled, and a polymer is recovered. This polymeric product is represented by the following structural formula:

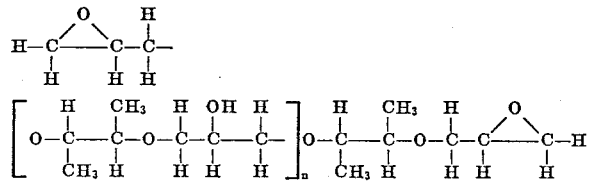

Example 50

The procedure of Example 1 is repeated with the difference that 2 mole percent of the epoxy-functional prepolymer is replaced by an equimolar amount of a different epoxy resin having molecular weight in the range of 300 to 4,000 and viscosity at 140° C. of less than 50 poises.

Example 51

The procedure of Example 1 is repeated with the difference that 20 mole percent of the epoxy-functional prepolymer is replaced by an equimolar amount of a different epoxy resin having molecular weight in the range of 300 to 4,000 and viscosity at 140° C. of less than 50 poises.

Example 52

The procedure of Examples 1 and 44 are repeated with the difference that the amount of catalyst employed in the molding powder is about 0.05 weight percent.

Example 53

The procedures of Examples 1 and 44 are repeated with the difference that the amount of catalyst employed in the molding powder is about 0.25 weight percent.

Example 54

The procedures of Examples 1 and 44 are repeated with the difference that the amount of catalyst is the molding powder is about 0.5 weight percent.

Example 55

The procedures of Examples 1 and 44 are repeaed with the difference that the amount of catalyst in the molding powder is about 1.0 weight percent.

Example 56

The procedure of Example 1 is repeated with the difference that for the tetrabutyl ammonium iodide there is substituted an equimolar amount of triethylene diamine.

Example 57

The procedure of Example 1 is repeated with the difference that for the tetrabutyl ammonium iodide there is substituted an equimolar amount of trimethylamine - p - toluene sulfonate.

Example 58

The procedure of Example 1 is repeated with the difference that for the tetrabutyl ammonium iodide there is substituted an equimolar amount of 2-ethyl-4-methyl imidazole.

Example 59

The procedure of Example 1 is repeated with the difference that for the tetrabutyl ammonium iodide there is substituted an equimolar amount of lithium benzoate.

These examples are illustrative of the invention defined in the appended claims. Those skilled in the art will be aware that modifications can be made in such examples without departing from the scope of the invention as set forth in the general disclosure and the appended claims.

What is claimed is:

1. A molding mixture which comprises a particulate intimate mixture of:
   (A) an epoxy-functional copolymer of acrylic monomers
      (1) consisting essentially of about 15 to about 40 weight percent glycidyl methacrylate, about 10 to about 30 weight percent methacrylonitrile, and a remainder consisting essentially of methyl methacrylate, and
      (2) having an average molecular weight in the range of about 1,500 to about 16,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and
   (B) a $C_4$–$C_{20}$ dibasic acid having melting point in the range of 30° to 160° C., said dibasic acid being present in an amount which provides about 0.8 to about 1.2 carboxyl groups per each epoxy group in the molding powder.

2. A molding powder in accordance with Claim 1 wherein said copolymer has an average molecular weight in the range of about 2,000 to about 10,000.

3. A molding powder in accordance with Claim 1 wheren said copolymer has an average molecular weight in the range of about 3,500 to about 8,000.

4. A molding powder in accordance with Claim 1 wherein said dibasic acid is a $C_6$–$C_{10}$ dibasic acid.

5. A molding powder in accordance with Claim 1 wherein said dibasic acid has an odd number of carbon atoms.

6. A molding powder in accordance with Claim 1 wherein, in addition to said epoxy-functional copolymer of acrylic monomers, there is employed an epoxy functional compound including at least two epoxy groups which has a molecular weight in the range of about 300 to about 4,000 and a viscosity at 140° C. of less than 50 poises, said epoxy functional compound being of different composition than said copolymer and being employed in an amount providing about 2 to about 20 percent of the epoxy groups in said molding powder.

7. A molding powder in accordance with Claim 1 wherein at least a minor portion but not more than ⅓ of said methyl methacrylate is replaced with a monomer selected from the group consisting essentially of styrene, alpha-methyl styrene, vinyl acetate and an ester of acrylic or methacrylic acid and a monohydric alcohol other than methanol.

8. A molding powder in accordance with Claim 1 wherein said epoxy-functional copolymer of acrylic monomers consists essentially of about 20 to about 35 weight percent glycidyl methacrylate, about 10 to about 25 weight percent methacrylonitrile, and a remainder consisting essentially of methyl methacrylate.

9. A molding powder which comprises a particulate intimate mixture of:
   (A) an epoxy-functional copolymer of acrylic monomers
      (1) consisting of about 20 to about 35 weight percent glycidyl methacrylate, about 10 to about 25 weight percent methacrylonitrile, and a remainder consisting essentially of methyl methacrylate, and
      (2) having an average molecular weight in the range of about 2,000 to about 10,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and
   (B) a $C_6$–$C_{10}$ dibasic acid having a melting point in the range of 30° to 130° C., said dibasic acid being present in an amount which provides about 0.8 to about 1.2 carboxyl groups per each epoxy group in the molding powder.

10. A molding powder in accordance with Claim 9 wherein said copolymer has an average molecular weight in the range of about 3,500 to about 8,000.

11. A molding powder in accordance with Claim 9 wherein said dibasic acid has an odd number of carbon atoms.

12. A molding powder in accordance with Claim 9 wherein, in addition to said epoxy functional copolymer of acrylic monomers, there is employed a diepoxide of different composition than said copolymer which has a molecular weight in the range of about 300 to about 4,000 and a viscosity at 140° C. of less than 50 poises, said diepoxide being employed in an amount providing about 2 to about 20 percent of the epoxy groups in said molding powder.

13. A molded article having a glass transition temperature above 90° C., a flexural strength above about 16,000 p.s.i., a flexural modulus above about $1.2 \times 10^6$ p.s.i. and an elongation-to-break above 1 percent and being formed from a molding powder which comprises a particulate, intimate mixture of:
  (A) an epoxy-functional copolymer of acrylic monomers
    (1) consisting essentially of about 15 to about 40 weight percent glycidyl methacrylate, about 10 to about 30 weight percent methacrylonitrile, and a remainder consisting essentially of methyl methacrylate, and
    (2) having an average molecular weight in the range of about 1,500 to about 16,000, with less than 5 percent of the molecules of said copolymer having a molecular weight below 1,000, a softening point above 25° C., and epoxide groups in its molecular structure resultant of inclusion of said glycidyl methacrylate as a constituent monomer thereof, and
  (B) a $C_4$–$C_{20}$ dibasic acid having a melting point in the range of 30° to 130° C., said dibasic acid being present in an amount which provides about 0.8 to about 1.2 carboxyl groups per each epoxy group in the molding powder.

14. A molded article in accordance with Claim 13 wherein said copolymer has an average molecular weight in the range of about 2,000 to about 10,000.

15. A molded article in accordance with Claim 13 wherein said copolymer has an average molecular weight in the range of about 3,500 to about 8,000.

16. A molded article in accordance with Claim 13 wherein said dibasic acid has an odd number of carbon atoms.

17. A molded article in accordance with Claim 13 wherein, in addition to said epoxy-functional copolymer of acrylic monomers, there is employed an epoxy functional compound including at least two epoxy groups which has a molecular weight in the range of about 300 to about 4,000 and a viscosity at 140° C. of less than 50 poises, said epoxy functional compound being of different composition than said copolymer and being employed in an amount providing about 2 to about 20 percent of the epoxy groups in said molding powder.

18. A molded article in accordance with Claim 13 wherein said epoxy-functional copolymer of acrylic monomers consists essentially of about 20 to about 35 weight percent glycidyl methacrylate, about 10 to about 25 weight percent methacrylonitrile and a remainder consisting essentially of methyl methacrylate.

19. A molded article in accordance with Claim 13 wherein said article contains particulate, reinforcing filler which is intimately dispersed with said copolymer and dibasic acid.

20. A molded article in accordance with Claim 13 wherein said article contains glass fibers which are intimately dispersed with said copolymer and dibasic acid.

References Cited
UNITED STATES PATENTS

| | | | |
|---|---|---|---|
| 2,580,901 | 1/1952 | Erickson et al. | 260—80.72 |
| 3,405,088 | 10/1968 | Slocum | 260—41 A |
| 3,201,497 | 8/1965 | Heino | 260—80.72 |
| 2,857,354 | 10/1958 | Fang | 260—41 A |
| 2,556,075 | 6/1951 | Erickson | 260—80.72 X |
| 3,652,476 | 3/1972 | Fellers et al. | 260—80.72 X |

OTHER REFERENCES

Lee et al.; Handbook of Epoxy Resins, McGraw-Hill Book Co., 1967, pages 11–18, 15–19, 20, 16–3, 5, 7; Sci. Lib., TP 1180E6 L4.

L. T. JACOBS, Primary Examiner

U.S. Cl. X.R.

260—42.28, 80.72, 837